(12) United States Patent
Schwab et al.

(10) Patent No.: US 7,922,374 B2
(45) Date of Patent: Apr. 12, 2011

(54) VEHICLE LAMP ASSEMBLY

(75) Inventors: Leo F. Schwab, Fraser, MI (US); Alfred M. Allen, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 12/340,794

(22) Filed: Dec. 22, 2008
(Under 37 CFR 1.47)

(65) Prior Publication Data
US 2010/0157617 A1 Jun. 24, 2010

(51) Int. Cl.
*B60Q 1/26* (2006.01)
(52) U.S. Cl. .......................... 362/511; 362/540; 362/541
(58) Field of Classification Search .................. 362/511, 362/540, 541, 545
See application file for complete search history.

(56) References Cited

U.S. PATENT DOCUMENTS

| | | | |
|---|---|---|---|
| 2001/0046137 A1* | 11/2001 | Oyama et al. | 362/517 |
| 2008/0062710 A1* | 3/2008 | Stanitzok et al. | 362/541 |
| 2010/0014309 A1* | 1/2010 | Heidinger | 362/551 |

* cited by examiner

*Primary Examiner* — David V Bruce
(74) *Attorney, Agent, or Firm* — Quinn Law Group, PLLC

(57) ABSTRACT

The present invention provides various lamp assembly configurations for motorized vehicles. In one embodiment, the lamp assembly includes a light source, such as a light emitting diode (LED) module, that is operable to generate light. The light source is attached to the vehicle structure, located on the interior of the vehicle adjacent to the aperture. A light guide is operatively connected to the light source. The light guide is configured to transmit light generated by the light source to preselected locations along the exterior of the vehicle structure, and diffuse the light. The light guide is attached to the vehicle structure, located on the exterior of the vehicle adjacent to the aperture in opposing relation to the light source. The cross-sectional area of the aperture formed through the vehicle structure is less than the cross-sectional areas of the LED module body and the light emitting segment of the light guide.

19 Claims, 3 Drawing Sheets

VEHICLE LAMP ASSEMBLY

TECHNICAL FIELD

The present invention relates generally to lamp assemblies for motorized vehicles. More specifically, this invention relates to arrangements for packaging lamp assemblies and attaching such lamp assemblies to the vehicle.

BACKGROUND OF THE INVENTION

Current production motorized vehicles, such as the modern-day automobile, are originally equipped with a lighting system to provide interior and exterior illumination for the vehicle operator. Such lighting systems include an array of lamp assemblies that are mounted or integrated to the front, sides and rear of the vehicle. The purpose of these lamp assemblies is to provide illumination for the driver to safely operate the vehicle in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle.

All automobiles must be equipped with rear brake lights that illuminate upon actuation of the vehicle brakes to indicate that the vehicle is slowing or stopping. Generally fitted in multiples of two, symmetrically at the left and right edges of the vehicle rear, the brake lights are red, steady-burning lamps that are activated when the driver applies pressure to the brake pedal. Many automobiles are also equipped with a central brake lamp that is mounted higher than the vehicle's traditional left and right brake lamps. The central brake lamp is known as a center high-mounted stop lamp, or "CHMSL" (pronounced chim-zul). The CHMSL is intended to provide a deceleration warning to following drivers whose view of the vehicle's regular stop lamps is blocked by interceding vehicles.

Conventional lamp assemblies include numerous internal parts, such as brackets, reflectors, bulbs, internal adjuster mechanisms, and, in some cases, a projector lamp. Additionally, lamp assemblies may include multiple lamps, or lamps used for multiple features. Traditionally, each lamp assembly is pre-assembled into a protective lamp housing prior to assembly to, or integration with the vehicle. The entire lamp assembly is then oriented along the outside surface of the vehicle body, fitted into a complementary sheet metal pocket formed in the vehicle exterior, and attached thereto at multiple locations via bolts, fasteners, and the like. Such lamp housings must be designed to meet packaging requirements specific to each vehicle platform with which it is used. In addition, a protective outer lens is also necessary to shield the internal lamp componentry from external debris, weather, and the like.

SUMMARY OF THE INVENTION

The present invention discloses a variety of lamp assemblies for motorized vehicles, such as the modern-day automobile. The lamp assemblies of the present invention offer significant advantages over prior art lamp assemblies. In one such example, this invention eliminates the need for a separate sheet metal lamp pocket that is normally required to provide a shell that nests the lamp assembly, and separates the internal compartment of the vehicle from the outside environment. In addition, using light guide technology, as proposed herein, eliminates the need for a protective outer housing and lens, which are traditionally integral parts of vehicle headlamp, tail lamp, and CHMSL assemblies. Accordingly, significant cost saving are realized through incorporation of the present invention into any vehicle platform.

Additional benefits offered by the present invention include significant styling advantages because the lamps presented herein can be designed narrower and with less depth than their traditional prior art counterparts. The lamp assemblies disclosed herein are also significantly smaller than traditional headlamp and tail lamp assemblies, freeing up otherwise scarce and valuable packaging space. Finally, because there is little or no preassembly required, and attachment of the lamp assemblies disclosed herein during vehicle production is greatly simplified, manual labor time and cost is significantly reduced. The simplistic design also mitigates warranty costs associated with general maintenance.

In accordance with one embodiment of the present invention, a lamp assembly is provided for a vehicle. The vehicle includes exterior structure, which may include, for example, a rear deck lid, rear quarter panel, lift gate window frame, etc., with an aperture formed therethrough. The lamp assembly includes a light source, such as a light emitting diode (LED) module, that is operable to generate light. The light source is configured to attach to the vehicle structure, adjacent to the aperture, on the interior of the vehicle. A light guide is operatively connected to the light source, and configured to transmit light generated by the light source to preselected locations along the exterior of the vehicle structure. The light guide is disposed on an exterior of the vehicle structure, adjacent to the aperture in opposing relation to the light source.

According to one aspect of this embodiment, the LED module includes a body portion with an interface portion that projects outward therefrom. The interface portion, which preferably contains a number of light emitting diodes, is configured to mate with the light guide. The cross-sectional area of the aperture in the vehicle structure is less than the cross-sectional area of the LED module body.

As part of another aspect of this particular embodiment, the light guide includes an interface segment that protrudes from a light emitting segment. The interface segment is configured to mate with the light source. The light emitting segment of the light guide is configured to diffuse light generated by the light source. Similar to the LED module body, the cross-sectional area of the light emitting segment is greater than the cross-sectional area of the aperture in the vehicle structure.

In accordance with one facet of this embodiment, the lamp assembly also includes a generally translucent lens member that is configured to cover the light guide. In this instance, the assembly also includes a housing configured to mate with and attach the lens and light source to the vehicle structure. For example, the housing has a cup portion with a flange portion extending outward from one end thereof. The cup portion defines a slot that is configured to receive and lock the light source to the housing. In addition, the flange portion includes a lens-to-housing joint that is designed to receive and attach the lens to the housing.

In an alternative facet of this embodiment, the lamp assembly may be characterized by the absence of a protective outer lens. In addition, or as an alternative thereto, the lamp assembly may also be characterized by the absence of a housing that is configured to mate with and attach the light source and light guide to the vehicle structure. Finally, the lamp assembly may be even further characterized by the absence of a sheet metal pocket that is attached to the vehicle structure, and engineered to nest the LED module therein.

According to another embodiment of the present invention, a rear brake light assembly is provided for a motorized vehicle. The rear brake light assembly includes a light emitting diode (LED) module having a module body with an interface portion projecting outward therefrom. The interface portion, which has one or more LEDs mounted thereto, is configured to fit within an aperture formed in the rear structure of the vehicle. The LED module body is disposed entirely on the interior of the vehicle structure. The brake light assembly also includes a light guide having an interface segment projecting from an elongated light emitting segment. The interface segment is configured to operatively mate with the LED module. The light emitting segment is disposed entirely on the exterior of the vehicle. The light emitting segment is configured to transmit and diffuse light generated by the LED module at preselected locations along the exterior of the vehicle structure.

In accordance with one facet of this specific embodiment, the aperture formed through the rear vehicle structure has a distinct cross-sectional area that is less than the cross-sectional areas of both the LED module body and the light emitting segment of the light guide.

According to another embodiment of this invention, a motorized vehicle is presented. The vehicle has a vehicle body with a front end opposing a rear end. A body panel is positively attached to the rear end of the vehicle body, overlying an internal compartment of the vehicle. The vehicle also includes an LED module having a module body with an interface portion projecting outward therefrom. The interface portion, which has at least one LED mounted thereto, extends into a receiving hole formed through the body panel. The LED module body is disposed entirely within the vehicle internal compartment. The vehicle also includes a light guide that has an interface segment projecting from an elongated light emitting segment. The interface segment abuts against the LED module interface portion. The light emitting segment is disposed entirely on the exterior of the vehicle body panel. The light emitting segment is configured to transmit and diffuse light generated by the LED module at preselected locations along the exterior of the vehicle body.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED
EMBODIMENTS

Figure 1:
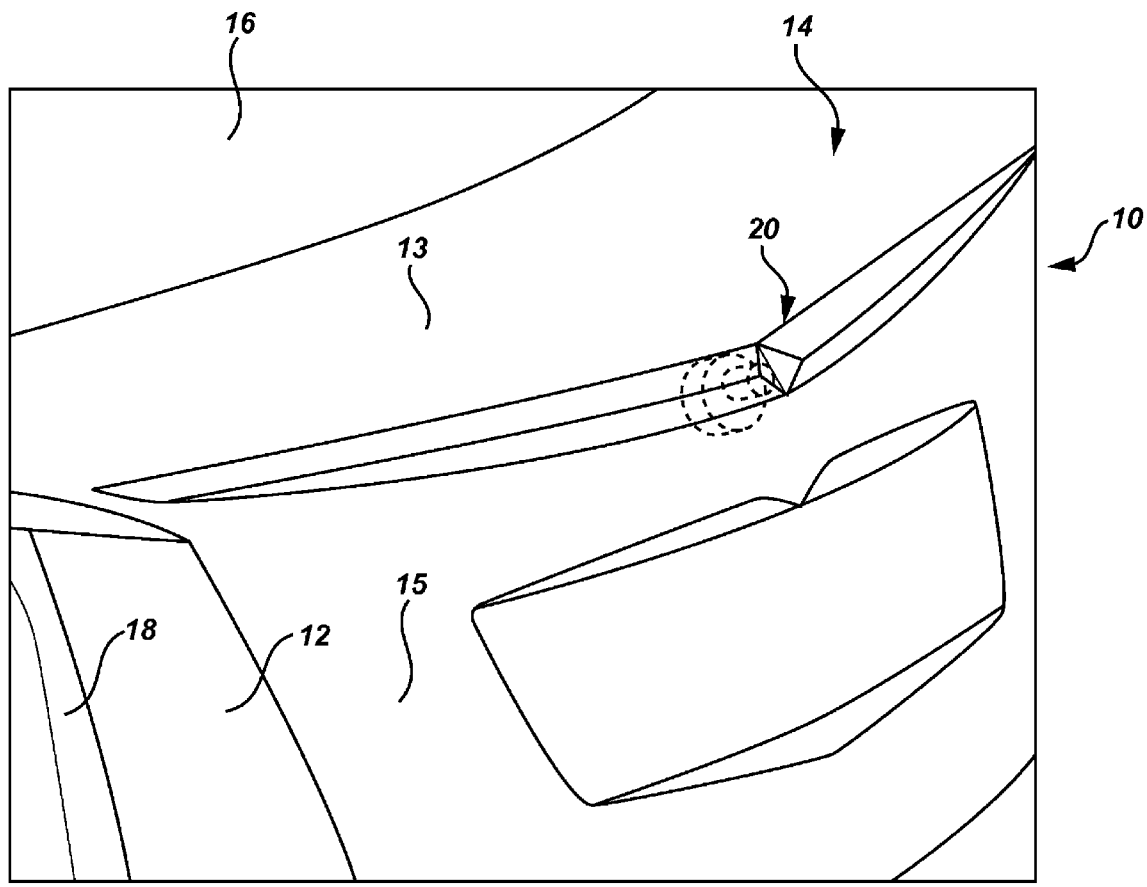
FIG. 1 is a perspective-view illustration of the rear portion of an exemplary motorized vehicle for integration and use of the present invention.

Referring to the drawings, wherein like reference numbers refer to like components throughout the several views, FIG. 1 is a perspective-view illustration of a representative motorized vehicle, identified generally as 10, with which the present invention may be incorporated and practiced. It should be readily understood that FIG. 1 is merely an exemplary application by which the present invention may be utilized. As such, the present invention is by no means limited to the vehicle configuration shown in FIG. 1. For instance, although the vehicle 10 is depicted in FIG. 1 as a standard passenger car, the present invention can be incorporated into any motorized vehicle platform, such as, but certainly not limited to, sport utility vehicles (SUVs), light trucks, heavy duty vehicles, minivans, conversion vans, buses, etc. Finally, the drawings presented herein are not to scale, and are provided purely for instructional purposes. Thus, the individual and relative dimensions and orientations shown in the drawings are not to be considered limiting.

The vehicle 10 has a vehicle body (also referred to herein as "vehicle structure"), which is represented, in part, by left- and right-hand rear quarter panels 12 (only one of which is visible in FIG. 1), a deck/trunk lid 14, a rear window 16, and left- and right-hand rear taillight assemblies 18 (only the left-hand assembly is evident in FIG. 1, but a mirror-image, right-hand counterpart is also present). The vehicle 10 also includes many conventional components, such as suspension, drive train, brake system, steering, and body components, that are well known in the art. Thus, these structures will not be illustrated or discussed in detail herein.

The deck lid 14 is pivotably mounted (e.g., via a lateral hinge pin and latch arrangement) along a forward edge thereof to the vehicle body, in between the rear quarter panels 12 and adjacent to a rearward most edge of the rear window 16. The deck lid 14 is operable to selectively transition between a closed position, in which the deck lid 14 covers and generally obstructs access to an internal compartment or trunk (as seen in FIG. 1), to an open position (not shown), providing easy, generally unobstructed access to the trunk compartment (indicated generally at 22 in FIG. 2). A center high-mounted stop lamp (CHMSL) assembly, designated generally at 20, is mounted on the rear of vehicle 10, as will be explained in extensive detail below. In the exemplary embodiment of FIG. 1, the CHMSL 20 is rigidly attached to a central location of the deck lid 14, at the intersection of a generally horizontal, forward portion 13 and generally vertical, rearward portion 15 of the deck lid 14.

Figure 2:
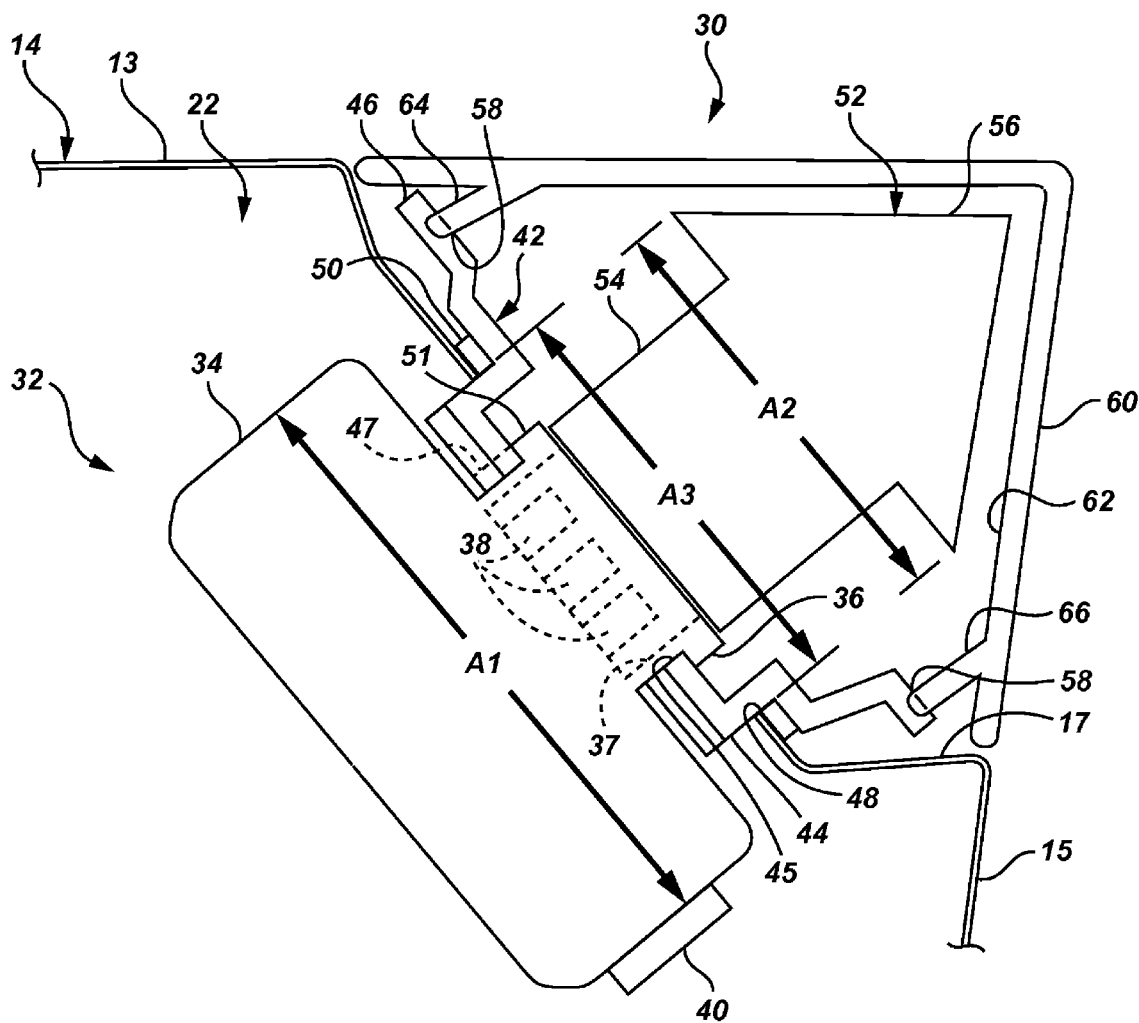
FIG. 2 is a schematic side-view illustration of a vehicle lamp assembly in accordance with one embodiment of the present invention.

Turning to FIG. 2, a vehicle lamp assembly, indicated generally by reference numeral 30, is schematically illustrated in accordance with one embodiment of the present invention. The vehicle lamp assembly 30 is depicted as a CHMSL assembly, such as that which is shown at 20 in FIG. 1. It should be recognized, however, that the novel and inventive aspects of the present invention may be incorporated and applied to other vehicle lamp assembly configurations, such as the rear taillights 18 of FIG. 1, without departing from the scope and spirit of the present invention.

The lamp assembly 30 includes a light emitting diode (LED) module 32 (also referred to herein as "light source member"). The LED module 32 consists of two primary segments: a module body 34 and an interface portion 36. The module body 34 is a round, generally puck-shaped section which houses an electric circuit board (not specifically called out or described herein) and other internal electric componentry. An electrical terminal 40, which protrudes from a portion of the module body 34 outer periphery, is adapted to receive an electrical connector (not shown) to provide electric communication between the LED module 32 and an onboard vehicle computer operable to regulate and power the LED module 32.

The interface portion 36 is a generally cylindrical segment that extends perpendicularly from a rearward-most planar surface of the module body 34. A plurality of light emitting diodes (each shown hidden in FIG. 2 at 38) are operatively oriented inside a recessed well 37, fixed therein to the interface portion 36 of the LED module 32. Each LED 38 is a semiconductor device, made from a known semiconductor material, such as aluminum-gallium-arsenide, that emits light when an electric current is applied thereto. While the embodiment of FIG. 1 shows three LEDs 38, the number and orientation of LEDs may vary to suit the purpose of the lighting arrangement 30. Moreover, the size and geometry of the module body 34 and interface portion 36 may be individually or collectively varied to meet the particular needs of the intended application of LED module 32.

With continuing reference to FIG. 2, a housing 42 mates with and attaches the LED module 32 to the vehicle body. By way of example, and not limitation, the housing 42 has a generally cylindrical cup portion 44 with a flange portion 46 that extends radially outward from a rearward-most end thereof, creating a generally hat-shaped geometry. The housing cup portion 44 is passed through a complementary aperture or receiving hole 48 that is formed through a recessed portion 17 of the deck lid 14 that is centrally located between the generally horizontal and generally vertical portions 13, 15. A gasket or seal 50 extends continuously around the outer periphery of cup portion 44, intermediate to the flange portion 46 and deck lid 14, creating a weather-tight seal.

The cup portion 44 defines a slot 45 that is shaped and sized to receive the interface portion 36 of the LED module 32. The slot 45 has at least one channel-like key feature, shown hidden at 47 in FIG. 2, designed to receive a corresponding locking tab 51 that protrudes radially outward from a distal end of the interface portion 36. By pressing, pushing, or otherwise sliding the interface portion 36 and locking tab 51 through the slot 45 and key feature 47, respectively, and subsequently rotating the module body 34, the LED module 32 is thereby rigidly secured to the housing 42 and, thus, the deck lid 14. Once securely locked, the distal end of the LED module interface portion 36 extends into, and is at least partially circumscribed by the deck lid aperture 48. The LED module body 34, on the other hand, is disposed entirely on the interior-side of the deck lid 14, inside the trunk compartment 22. In contrast to prior art lamp assemblies, substantially all of the light source presented herein—i.e., LED module 32, is inside the vehicle 10.

The vehicle lamp assembly 30 also includes a light guide (or "light guide member"), which is generally designated 52 in FIG. 2. The light guide 52 has two primary portions: a generally cylindrical interface segment 54 which projects orthogonally from the central region of an elongated light emitting segment 56. The dimensions, geometry, and orientation of the interface segment 54 and light emitting segment 56 may be customized to address the requirements of a particular vehicle application without departing from the scope of the present invention.

In the embodiment of FIG. 2, the light emitting segment 56 is disposed entirely on the exterior of the vehicle 10, extending transversely across the deck lid 14, over the aperture 48. The light emitting segment 56 is attached to the deck lid 14 by any known means (e.g., via adhesives, threaded fasteners, etc.). A distal end of the interface segment 54 presses against and overlies the distal open-end of the recessed well 37. The interface segment 54 captures light generated by the LED module 32, and transmits the light to the light emitting segment 56. The light emitting segment 56 is fabricated from a material that can transmit light generated by the LEDs 38 to preselected locations along the exterior of the deck lid 14 (see, e.g., FIG. 1), and diffuse the light in preselected amounts across the length of the light emitting segment 56. Such materials may include, but are certainly not limited to, polymethylmethacrylate, polycarbonate, polyethylene terephthalate, and combinations thereof.

A generally translucent, protective outer lens 60 extends over and covers the recessed portion 17 of the deck lid 14. In the exemplary configuration shown in FIG. 2, the lens 60 includes first and second legs 64 and 66, respectively. Each leg 64, 66 is configured to press into and lock (or weld) with a corresponding lens-to-housing joint 58 in the flange 46 of the housing 42. The lens 60 defines an elongated channel 62 that is fabricated to compliment the shape and dimensions of the elongated light emitting segment 56 of the light guide 52. For example, as seen in FIG. 2, the outer lens 60 has a generally triangular profile that is slightly larger than the triangular profile of the light emitting segment 56. As such, the light emitting segment 56 is received by, and nested inside the lens channel 62.

With continuing reference to FIG. 2, the LED module body 34 has an axial cross-sectional area, which is represented in FIG. 2 at A1. In a similar regard, the elongated light emitting segment 56 of the light guide 52 has a transverse cross-sectional area (i.e., a cross-sectional area overlying aperture 48), which is represented in FIG. 2 at A2. Ideally, the cross-sectional area of the receiving hole 48, which is represented in FIG. 2 at A3, is less than the cross-sectional area A1 of the module body 34 and the cross-sectional area A2 of the light emitting segment 56. In one application, the light emitting segment 56 extends several millimeters (i.e., 200-300 mm) in the cross-car direction; hence, the cross-sectional A2 is much larger than the cross-sectional area A3 of the receiving hole 48. The present invention minimizes pocket depth requirements for the lamp assembly, thereby eliminating the need for a sheet metal lamp pocket part that is normally required to provide a shell to nest the lamp assembly, and separates the trunk compartment 22 of the vehicle 10 from the outside environment.

Figure 4:
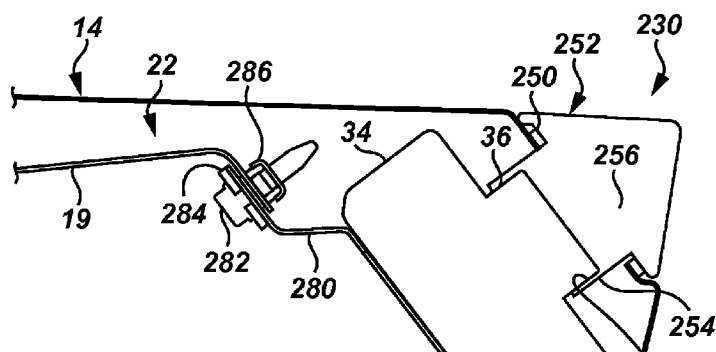
FIG. 4 is a schematic side-view illustration of a vehicle lamp assembly in accordance with yet another embodiment of the present invention.
Figure 3:
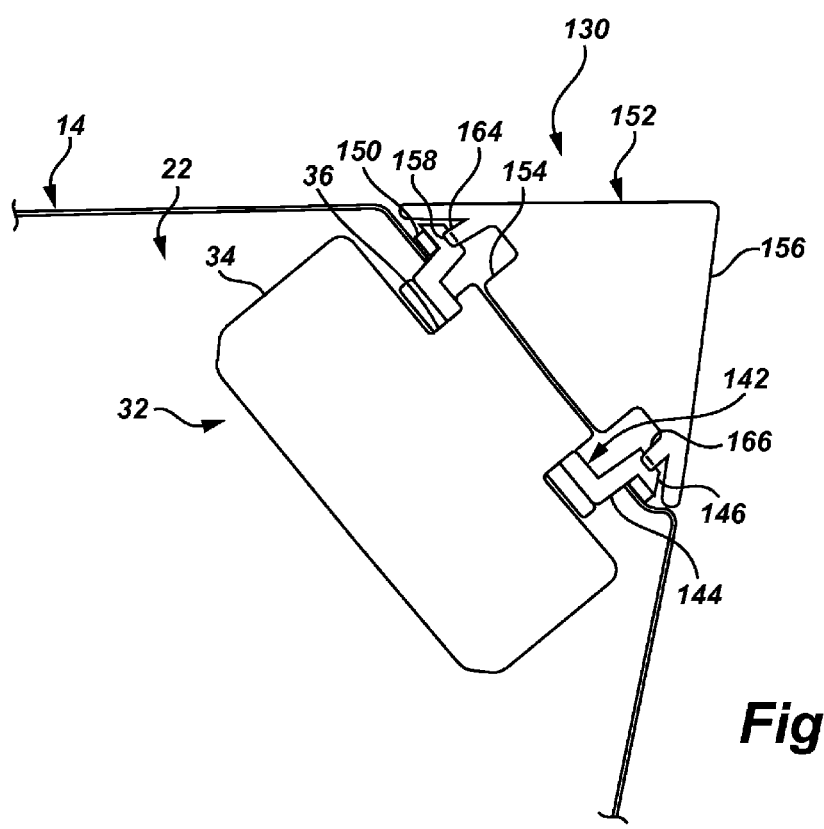
FIG. 3 is a schematic side-view illustration of a vehicle lamp assembly in accordance with another embodiment of the present invention.

FIGS. 3 and 4 illustrate additional vehicle lamp assembly configurations in accordance with the present invention. As noted hereinabove, like reference numerals are used in FIGS. 3 and 4 to indicate similar structure from FIGS. 1 and 2. The vehicle lamp assembly 130 illustrated in FIG. 3, similar to the lamp assembly 30 presented in FIG. 2, includes an LED module 32 with a module body 34 and an interface portion 36 projecting outward therefrom. The LED module 32 is operable as described hereinabove. The lamp assembly 130 also includes a light guide, generally designated 152 in FIG. 3, with a generally cylindrical interface segment 154 which projects orthogonally from the central region of an elongated light emitting segment 156. The light guide 152 functions in a manner synonymous to the light guide 52, as described above with respect to FIG. 2.

A housing 142 mates with and attaches the LED module 32 and light guide 152 to the vehicle body. By way of example, and not limitation, the housing 142 has a generally cylindrical cup portion 144 with a flange portion 146 that extends radially outward from a rearward-most edge thereof. The housing cup portion 144 is passed through the receiving hole 48, and attached to the deck lid recessed portion 17. A seal/gasket 50 extends continuously around the outer periphery of the cup portion 144, in-between the flange portion 146 and deck lid 14. The cup portion 144 of FIG. 3 is configured as described above with respect to the cup portion 44 of FIG. 2 to receive and lock the LED module 32 to the housing 142. Accordingly, when the LED module 32 is securely locked to the housing 142 and, thus, the deck lid 14, the distal end of the LED module interface portion 36 extends into, and is at least partially circumscribed by the deck lid aperture 48. The LED module body 34, on the other hand, is disposed on the interior-side of the deck lid 14, entirely inside the trunk compartment 22.

In the embodiment of FIG. 3, the light guide 152 extends over and covers the recessed portion 17 of the deck lid 14. The light guide 152 includes first and second legs 164 and 166, respectively. Each leg 164, 166 is configured to press into and lock or weld with a corresponding joint 158 in the flange 146 of the housing 142. When the light guide 152 is securely locked to the housing 142 and, thus, the deck lid 14, the light emitting segment 156 is disposed entirely on the exterior of the vehicle 10, extending transversely across the deck lid 14, over the aperture 48. It can be said then, that the vehicle lamp assembly of FIG. 3 is characterized by the absence of an outer lens, which is traditionally an integral part of prior art headlamp, tail lamp, and CHMSL assemblies.

FIG. 4 of the drawings is a schematic side-view illustration of a vehicle lamp assembly 230 in accordance with an alternative embodiment of the present invention. The lamp assembly 230 illustrated in FIG. 4, similar to the vehicle lamp assemblies 30 and 130 presented in FIGS. 2 and 3, respectively, includes an LED module 32 with a module body 34 and an interface portion 36 projecting outward therefrom. The LED module 32 is configured and operable as described hereinabove. The lamp assembly 230 also includes a light guide, generally designated 252 in FIG. 3, with a generally cylindrical interface segment 254 which projects orthogonally from the central region of an elongated light emitting segment 256. The light guide 252, and its constituent segments, functions in synonymously to the light guides 52 and 152, as described above with respect to FIGS. 2 and 3.

Using light guide technology, as proposed above, eliminates the need for a protective outer housing and lens, which are traditionally integral parts of vehicle headlamp, tail lamp, and CHMSL assemblies. As seen in FIG. 4, the light guide 252 extends over and covers the recessed portion 17 of the deck lid 14. The light guide 252 is attached directly to the deck lid 14 (e.g., via adhesives, threaded fasteners, etc.), such that the light emitting segment 256 is disposed entirely on the exterior of the vehicle 10, extending transversely across the deck lid 14, over the aperture 48. A gasket or seal 250 extends continuously around the outer periphery of the interface segment 254, in-between the light emitting segment 256 and deck lid 14, creating a weather-tight seal.

In the embodiment of FIG. 4, the vehicle 10 includes a bracket 280, which functions to operatively engage the LED module 32 with the light guide 252. The bracket 280 is rigidly fixed to the deck lid inner sheet metal 19, for example, by a plurality of bolts 282 the operatively mate with a corresponding washer 284 and push nut 286. The bracket 280 abuts against a forward edge of the LED module 32, and presses the interface portion 36 thereof into engagement with the interface segment 254 of the light guide 252. In this particular instance, the interface segment 254 defines a hollow cavity 255 that is configured to receive and surround the distal end of the LED module interface portion 36. In this particular embodiment, the entire LED module 32 is disposed on the interior-side of the deck lid 14, inside the trunk compartment 22.

While the best modes for carrying out the invention have been described in detail, those familiar with the art to which this invention relates will recognize various alternative designs and embodiments for practicing the invention within the scope of the appended claims.

The invention claimed is:

1. A lamp assembly for a vehicle having vehicle structure defining an aperture therethrough, the lamp assembly comprising:
    a light source member operable to generate light and configured to attach to the vehicle structure, wherein said light source member is disposed on an interior of the vehicle structure adjacent to the aperture; and
    a light guide member operatively connected to said light source member and configured to transmit light generated by the light source member to preselected locations along the exterior of the vehicle structure, wherein said light guide member is disposed on an exterior of the vehicle structure adjacent to the aperture in opposing relation to said light source member.

2. The lamp assembly of claim 1, wherein said light source member is a light emitting diode (LED) module.

3. The lamp assembly of claim 2, wherein said LED module includes a body portion with an interface portion projecting outward therefrom, said interface portion configured to operatively mate with said light guide member.

4. The lamp assembly of claim 3, wherein a cross-sectional area of the aperture is less than a cross-sectional area of said LED module body.

5. The lamp assembly of claim 1, wherein said light guide member includes an interface segment protruding from a light emitting segment, said interface segment configured to operatively mate with said light source member, and said light emitting segment configured to diffuse light generated by the light source member.

6. The lamp assembly of claim 5, wherein a cross-sectional area of the aperture is less than a cross-sectional area of said light emitting segment.

7. The lamp assembly of claim 1, further comprising:
    a generally translucent lens member configured to cover said light guide member; and
    a housing member configured to mate with and attach said lens member and said light source member to the vehicle structure.

8. The lamp assembly of claim 7, wherein said housing member has a cup portion with a flange portion extending outward from one end thereof, said cup portion defining a slot configured to receive and lock said light source member to said housing member, and wherein said flange portion includes a lens-to-housing joint configured to receive and attach said lens member to said housing member.

9. The lamp assembly of claim 1, characterized by the absence of a sheet metal pocket attached to the vehicle structure and configured to nest said light source therein.

10. The lamp assembly of claim 1, characterized by the absence of an outer lens.

11. The lamp assembly of claim 1, characterized by the absence of a housing that is configured to mate with and attach said light source member and said light guide member to the vehicle structure.

12. A rear brake light assembly for a motorized vehicle having rear vehicle structure with an aperture formed therethrough, the brake light assembly comprising:
    a light emitting diode (LED) module having a module body with an interface portion projecting outward therefrom, said interface portion configured to fit within the aperture and having at least one LED mounted thereto, wherein said LED module body is disposed entirely on an interior of the vehicle structure; and
    a light guide having an interface segment projecting from an elongated light emitting segment, said interface segment configured to operatively mate with said LED module, and said light emitting segment disposed entirely on an exterior of the vehicle structure and configured to transmit and diffuse light generated by the LED module at preselected locations along the exterior of the vehicle structure.

13. The brake light assembly of claim 12, wherein said LED module body has a first cross-sectional area, said light emitting segment has a second cross-sectional area, and the aperture formed through the rear vehicle structure has a third cross-sectional area that is less than said first and second cross-sectional areas.

14. The brake light assembly of claim 12, further comprising:
  a generally translucent rigid outer lens configured to receive and encase said light emitting segment therein; and
  a light housing configured to mate with and attach said outer lens and said LED module to the rear vehicle structure.

15. The brake light assembly of claim 14, wherein said housing has a generally cylindrical cup portion with a flange portion extending radially outward from one end thereof, said cup portion defining a slot configured to receive and lock said LED module to said housing, and wherein said flange portion includes a lens-to-housing joint configured to receive and attach said lens to said housing.

16. The brake light assembly of claim 12, characterized by the absence of a sheet metal pocket attached to the vehicle structure and configured to nest said light source therein.

17. The brake light assembly of claim 12, characterized by the absence of an outer lens configured to cover said light guide member.

18. The brake light assembly of claim 16, characterized by the absence of a housing that is configured to mate with and attach said LED module and said light guide member to the vehicle structure.

19. A motorized vehicle, comprising:
  a vehicle body having a front end opposing a rear end with at least one body panel positively attached thereto to define an internal compartment, said at least one body panel defining a receiving hole therethrough;
  a light emitting diode (LED) module having a module body with an interface portion projecting outward therefrom, said interface portion extending into said receiving hole and having at least one LED mounted thereto, wherein said module body is disposed entirely within said internal compartment; and
  a light guide having an interface segment projecting from an elongated light emitting segment, said interface segment abutting against said LED module interface portion, wherein said light emitting segment is disposed entirely on an exterior of the vehicle body panel and configured to transmit and diffuse light generated by the LED module at preselected locations along the exterior of the vehicle body.

* * * * *